2 Sheets—Sheet 1.

D. S. FISHER.
Velocipede.

No. 65,199.   Patented May 28, 1867.

Witnesses:
A. A. Yeatman
Charles Alexander.

Inventor:
D S Fisher
per
Alexander & Mason
Atty.

2 Sheets—Sheet 2.

D. S. FISHER.
Velocipede.

No 65,199. Patented May 28, 1867.

Witnesses:
A. A. Yeatman
Charles Alexander

Inventor:
D. S. Fisher
per
Alexander Mason.
Attys.

United States Patent Office.

D. S. FISHER, OF CEDAR SPRING, INDIANA.

Letters Patent No. 65,199, dated May 28, 1867.

IMPROVEMENT IN PROPELLING WHEELED CARRIAGES.

*The Schedule referred to in these Letters Patent and making part of the same.*

TO ALL WHOM IT MAY CONCERN:

Be it known that I, D. S. FISHER, of Cedar Spring, in the county of Harrison, and in the State of Indiana, have invented certain new and useful improvements in "Propelling Wheeled Carriages;" and do hereby declare that the following is a full, clear, and exact description thereof, reference being had to the accompanying drawings, and to the letters of reference marked thereon, making a part of this specification.

My invention consists in the construction of a carriage to be run without horse, steam, or other applied power.

Figure 1:
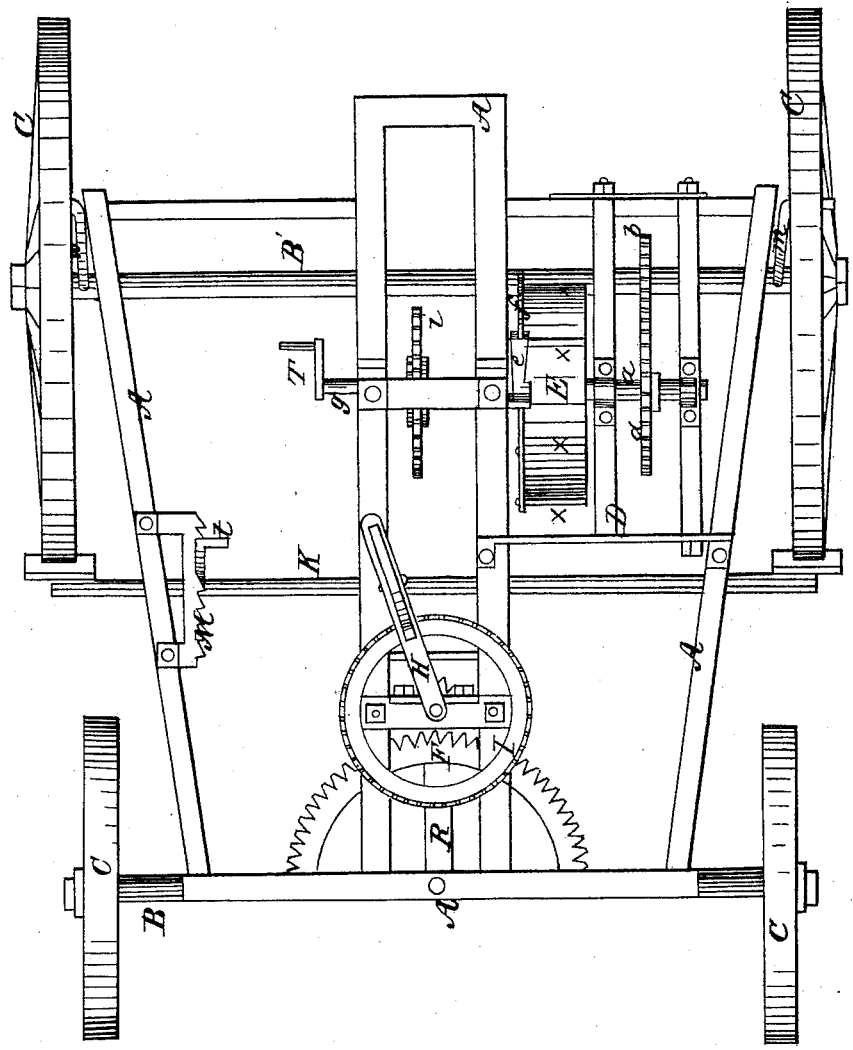
Figure 2:
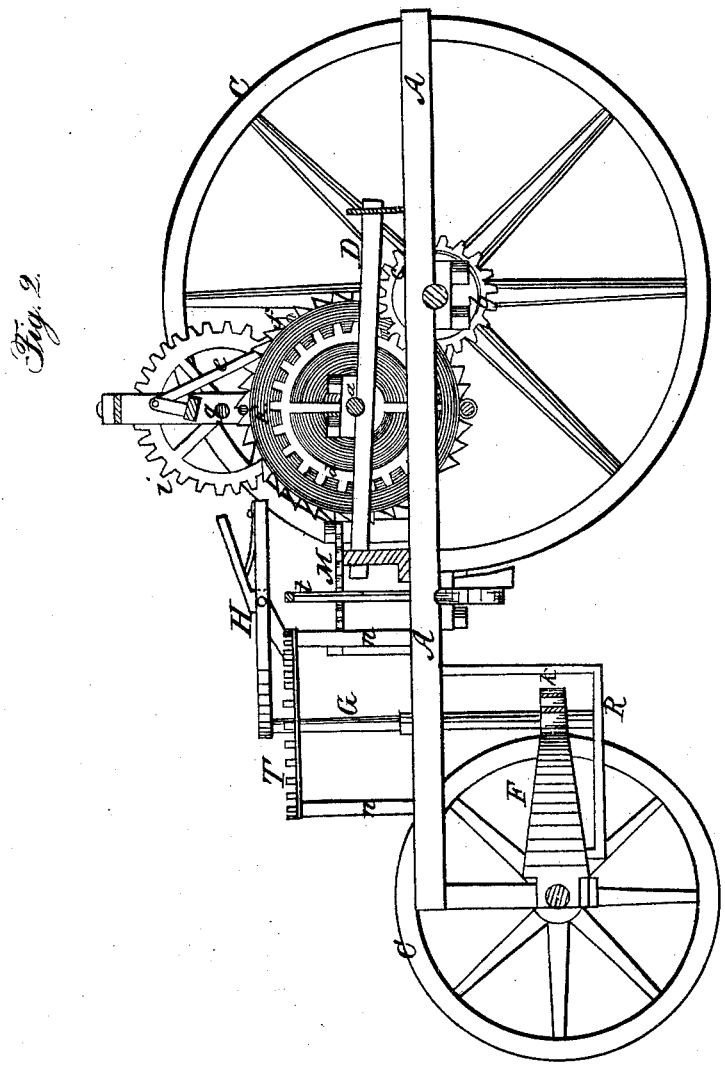

In the annexed drawings, A A represent a frame which is supported by the front and rear axles, B B', which have suitable wheels, C C. Upon the rear portion of this frame A is erected a small frame, D, forming bearings for a horizontal shaft, $a$, with a large cog-wheel, $d$, at one end, and a coil spring, E, at the other. The centre of the frame A being composed of two pieces of wood or metal, extends slightly to the rear of the other portions of the frame, as seen in fig. 1, and is provided with two uprights near the spring E, through which the shaft $a$ extends, and between which is secured (on said shaft) a small cog-wheel, not shown. There is a larger cog-wheel, $i$, secured upon a shaft, $g$, with crank, $y$, between the said uprights, and which said cog-wheel meshes into the small cog-wheel beneath it on the shaft $a$, and by said shaft passing the spring winds it up by the means of the crank $y$. The spring E is provided with a plate, $f$, notched on its edge, and provided with a series of pins, $x\ x$, for keeping the spring within its place. $e$ represents a hanging dog attached to one of the standards for catching in the notches of the plate $f$, and holding the spring as it is wound. Secured upon the rear axle B' is a cog-wheel, $b$, which is so placed that the larger cog $d$ meshes into it, turning the axle and revolving the wheels C C. It will be seen that the rear wheels are larger than the front ones, and that the wagon, by means of the unwinding of the spring E, is propelled. Secured to the forward axle B is a segment, F, which has cogs upon either its outer or inner face. G is a shaft extending from above the frame A, and supported by a bent bar, R, connected to the axle B. Near the bottom of said shaft is a cog-wheel which meshes into the segment F. Secured upon small uprights, $n\ n$, above the segment on the frame A, is a circular ratchet-wheel, I, for securing the lever H, which extends from and operates the shaft G, as shown. The lever, shaft, cog, and segment, are to guide and steer the vehicle. K represents the brake-shaft, having suitable brakes in front of the rear wheels C C, and with a lever, $t$, for pressing the brakes from or against the wheels, while there is a notched bar, M, at the side of the frame A, for holding the brake in its position. The body and springs of the vehicle are placed upon the frame, so that the crank $y$, lever H, and brake-lever $t$ extend up into the bed of the wagon, so that the entire gearing is out of sight. The operator winds up the spring E by means of the crank, and chocks the rear wheels by the cords or leather plugs, $w$. After the spring is wound the wheels are unchocked and the vehicle is propelled forward, as before stated, and guided by the lever H.

Having thus fully described my invention, what I claim as new, and desire to secure by Letters Patent, is—

1. The frame A, with small frame D, shaft $a$, spring E, cogs $d\ t$, and axle B', with cog-wheel $b$, all constructed, arranged, and operating in the manner substantially as and for the purposes specified.

2. The segment F, shaft G, ratchet I, lever H, and bar R, all constructed and arranged for guiding the vehicle, in the manner as set forth.

In testimony that I claim the foregoing I have hereunto set my hand this 29th day of January, 1867.

D. S. FISHER.

Witnesses:
C. L. VANCE,
M. M. HON.